US007680063B2

(12) United States Patent
Bedekar et al.

(10) Patent No.: US 7,680,063 B2
(45) Date of Patent: Mar. 16, 2010

(54) METHOD AND APPARATUS FOR SYNCHRONIZING TRANSMISSIONS FROM MULTIPLE TRANSMITTERS

(75) Inventors: Anand S. Bedekar, Arlington Heights, IL (US); Rajeev Agrawal, Northbrook, IL (US)

(73) Assignee: Motorola, Inc., Schaumburg, IL (US)

( * ) Notice: Subject to any disclaimer, the term of this patent is extended or adjusted under 35 U.S.C. 154(b) by 692 days.

(21) Appl. No.: 11/558,629

(22) Filed: Nov. 10, 2006

(65) Prior Publication Data

US 2008/0112440 A1 May 15, 2008

(51) Int. Cl.
*G06F 11/00* (2006.01)
*H04B 7/212* (2006.01)
*H04L 7/00* (2006.01)

(52) U.S. Cl. .................. 370/252; 370/442; 370/519; 375/356

(58) Field of Classification Search ......... 370/252–349, 370/350, 389–392, 508, 519, 521, 442–461; 709/247, 249; 375/240–356
See application file for complete search history.

(56) References Cited

U.S. PATENT DOCUMENTS

| 5,220,676 | A | | 6/1993 | LoGaibo et al. | |
| 6,031,846 | A | * | 2/2000 | Gurusami et al. | 370/508 |
| 6,748,559 | B1 | | 6/2004 | Pfister et al. | |
| 6,751,209 | B1 | * | 6/2004 | Hamiti et al. | 370/349 |
| 2003/0005160 | A1 | * | 1/2003 | Schaefer | 709/248 |
| 2003/0117991 | A1 | * | 6/2003 | Beyer et al. | 370/349 |

* cited by examiner

*Primary Examiner*—Afsar M. Qureshi

(57) ABSTRACT

A method and apparatus for transmitting packets in a wireless communication system (100). The method and apparatus determining a delay period from among the various delay times at each of a plurality of access nodes (106-110) wherein the delay time is the time it takes for a node to receive a data packet from a source (102) through a network (104). During transmission of data from the source, the nodes receive data packets and from the data packets, the wall clock time is determined. The packets are transmitted from the nodes at a time equivalent to the wall clock time and the delay period so that the packets are synchronously transmitted from the multiple nodes.

20 Claims, 4 Drawing Sheets

METHOD AND APPARATUS FOR SYNCHRONIZING TRANSMISSIONS FROM MULTIPLE TRANSMITTERS

FIELD OF THE INVENTION

The present invention relates generally to a method and apparatus for synchronizing transmissions from multiple transmitters and, in particular, synchronizing transmissions of a Real Time Protocol stream across multiple transmitters where the stream is received from a signal source.

BACKGROUND

In systems supporting multicast and broadcast services, it is often required to synchronize the transmission of multiple transmitters so as to boost the signal received by multiple mobile stations. For example, in IEEE 802.16 and WiMAX systems, multiple transmitters, or access nodes, need to simultaneously and synchronously transmit the same Real Time Packet/Universal Data Protocol/Internet Protocol (RTP/UDP/IP) data for streaming video and the like. The access nodes obtain the data through a common IP multicast or broadcast group over an IP multicast network. Packets for the multicast or broadcast may arrive at the access nodes with differing delays due to non-synchronous nature of IP multicast or broadcast forwarding. Packets may also be non-synchronous because packets may be lost along the multicast forwarding path.

One possible means to accomplish synchronization for multicast or broadcast transmissions between multiple access nodes is to place a special centralized node in the path of the multicast transmissions. This special node can buffer the data to remove the variability in the delay, and based on the packets that have arrived, decide on a schedule for transmission for each transmitter access node. The special node can then multicast or broadcast the data to be transmitted along with special information indicating the transmission time of each unit of data to thereby ensure synchronous transmissions of the data from the access nodes.

Such a special node is impractical because of the added expense of the node. In addition, a special node raises reliability concerns as a single point of failure within a network. It is also raises difficulty in determining a desirable location for the special node because it should be within a suitable distance from each of the access nodes to ensure synchronization between the nodes and without adding additional delays for the transmission between the special node and the multiple access nodes.

In an alternative solution to the synchronization issues, a method has been developed that ensures that all transmitters that are transmitting at a given instant are synchronized with each other even in the presence of random packet losses in the IP multicast delivery. According to this method, there is a set of packets that have arrived at each of the access nodes buffers at any given point in time. If a packet is lost or inordinately delayed along the multicast path delivering the packet to one of the access nodes, there will be a mismatch between the sequences of packets that have arrived at this node as compared to other nodes. To detect such mismatches, each transmitter node sends feedback messages identifying the packets currently in its buffer to a leader node. Each packet is identified using some unique identifier like an RTP sequence number together with a UDP checksum or the like. The length and position of the packet in the queue is also indicated.

The leader node "merges" the feedback to produce a unified or merged sequence of packets that should be transmitted by all the transmitters, and also decides the time at which transmission of these packets should begin. The leader node then sends to the access nodes the merged sequence along with the scheduled transmission time. It is assumed that the transmission parameters of the packets on the wireless interface are known a priori to the transmitter nodes. Thus, once the length of the packet is known, the duration of transmission of the packet is also uniquely known. Each transmitter node now transmits those packets out of the merged sequence that are present in its buffer at the scheduled times, and stays silent during the durations of transmissions of packets that it has not received so as to avoid causing interference. This alternative method of synchronization raises concerns based on the amount of signaling required between the leader node and the other access nodes in order to ensure synchronous transmission. In other words, this prior art solution, whilst avoiding the need for a special node, is adding another element that can cause synchronization issues.

In view of the foregoing, there is a need for a method and apparatus that enables synchronous transmission of multicast or broadcast data from access nodes that may receive the data asynchronously from a source without the addition of special network equipment and that avoids excessive signaling between the access nodes for achieving synchronous transmission.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
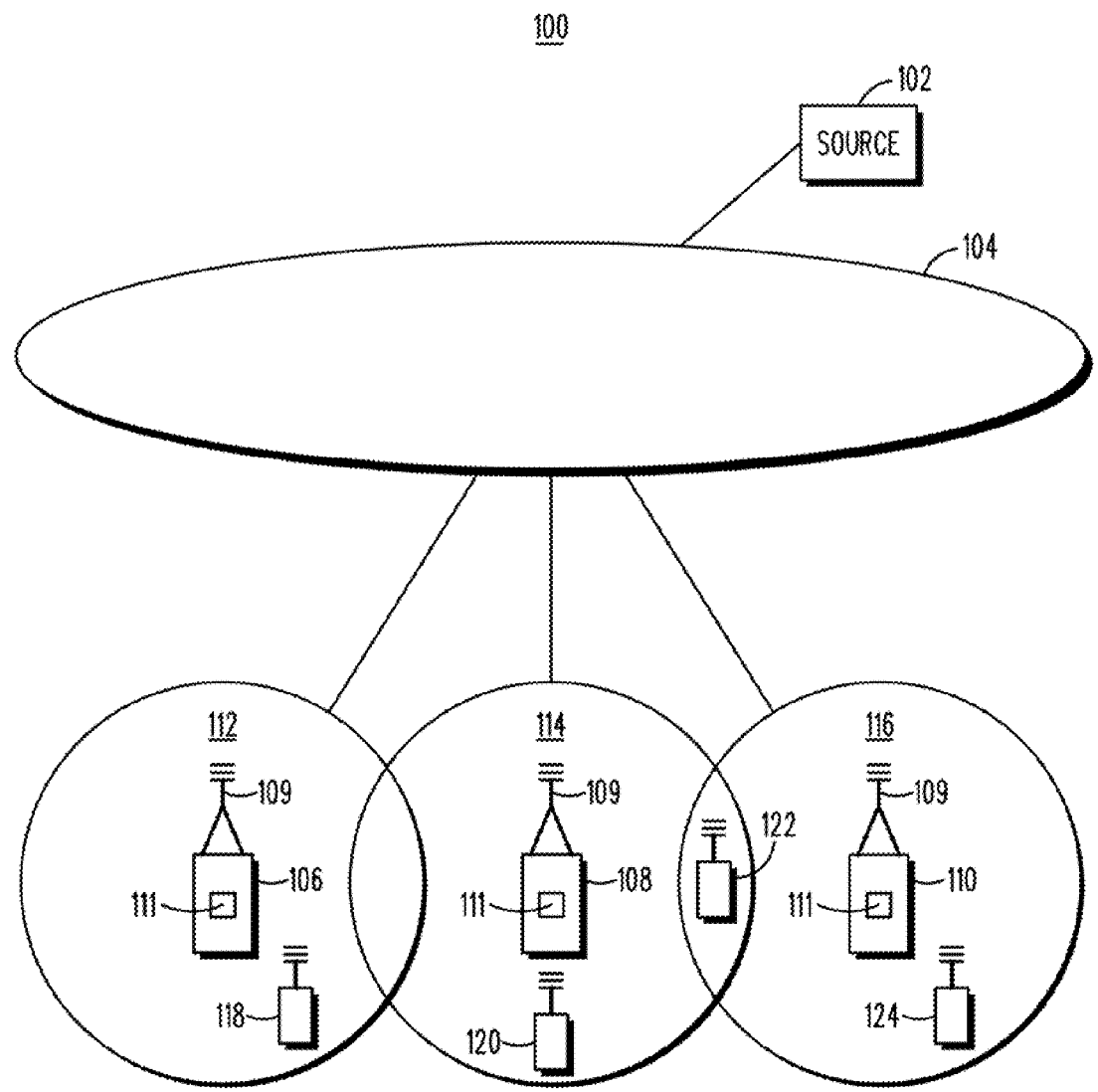
FIG. 1 is a block diagram of a wireless communication system that operates in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to method and apparatus for synchronizing the transmission of data packets such as Real Time Protocol (RTP) packets from multiple transmitters. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for synchronizing the transmission of data packets such as Real Time Protocol (RTP) packets from multiple transmitters described herein. The non-processor circuits may include, but are not limited to, a radio receiver, a radio transmitter, signal drivers, clock circuits, power source circuits, and user input devices. As such, these functions may be interpreted as steps of a method to synchronize the transmission of data packets such as Real Time Protocol (RTP) packets from multiple transmitters. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is directed to a method and apparatus of transmitting packets in a wireless communication system. The wireless communication system includes a source of multicast or broadcast data that supplies the multicast or broadcast data to a communication network, for example using Internet Protocol (IP) multicast. Included in the communication network are a plurality of access or transmission nodes that receive data packets from the communication network and transmit the data packets to a plurality of wireless mobile stations or user equipment. The access nodes can be known base stations and the mobile stations can be various wireless devices including cellular phones, pagers, personal digital assistants, personal computers and the like. The transmission of data from the access nodes to the mobile stations can be over one of a variety of wireless technologies, such as IEEE 802.16, CDMA, OFDM, UMTS, HSDPA, etc. In an embodiment of the present invention, the source may be a streaming video server that is supplying streaming data to the Internet that is therefore distributed to the access nodes and wirelessly distributed to various users on their mobile stations.

The method and apparatus of the present invention determines a first delay period that can be used by each of the plurality of access or transmission nodes to synchronously send multicast data packets to mobile stations. This delay period can be based on a second delay period that can be determined for each of the access or transmission nodes. For example, a central location or lead node can compare these delays in order to determine a suitable delay period to be used by each of the access nodes. This latter delay period is then distributed to each of the plurality of access nodes.

Each of the plurality of access nodes receives data packets containing the source data from the multicast wireless communication network. A data packet can be any type of data packet and in an embodiment is one of a RTP packet, a Real Time Control Protocol (RTCP) data packet, a Secure Real Time Protocol (SRTP) data packet, Universal Data Protocol (UDP) packets and Internet Protocol (IP) data packets. Each of these data packets includes header or control data and payload data. Included in the control data can be, among other data, sampling counters and time stamps. Based on information included in a data packet, each access node determines or calculates the actual wall clock time at which the data packet was sent from the source. In order to synchronously send the data packet from each of a plurality of access nodes, the present invention enables the access nodes to transmit the data packet at a transmission time that is a function of the determined wall clock time and the delay period. The determined wall clock time is the same at each of the nodes and the delay period is the same at each of the nodes. As the delay period is set to a time in which each of the plurality of nodes has received the data packets, the transmission time that is a function of the wall clock time and the delay period provides a means for each of the plurality of access nodes to synchronously transmit the data packet.

An embodiment of the present invention includes an access node for use in a wireless communication network. The access node includes a transceiver for transmitting and receiving data. When the access node is in an 802.16 system or its equivalent, the data can be in the form of RTP, UDP, IP, RTCP, SRTP and other equivalent types of data packets. The node includes a controller that is coupled to the transceiver and controls the operation of the node and its transceiver. The controller is configured to determine a delay period, which is an upper bound on the period between a time that a packet was sent by the source and a time when the packet was actually received by the node. Based on the data packet received and from data provided in that data packet, a wall clock time is determined. The wall clock time can be determined using a time stamp and a sampling counter that are provided with the data packet. The controller then determines a transmit time to transmit the received packets wherein the transmit time is based on the determined delay time and the wall clock time so that the data packets are synchronously transmitted from each of the plurality of access or transmission nodes where the data packets may have been received by each of the plurality of access nodes asynchronously.

A wireless communication system is disclosed in connection with the present invention. The wireless communication system includes a source of data where the source can provide multicast data such as streaming video or audio data. The system also includes a communication network such as an IP multicast network that receives the data from the source and transmits the data in packets to a plurality of access nodes. Each of the plurality of access nodes can receive the packets asynchronously from another of the plurality of access nodes but it is desired that each of the plurality of access nodes synchronously transmits the packets to mobile stations. To synchronously transmit the data packets, the access nodes use a determined delay period and a wall clock time where the wall clock time is determined at each of the access nodes based on data received from the received data packets. In an embodiment, the determined delay period is received by each of the plurality of nodes from a lead node or a central location within the wireless communication system or wireless communication network and is at least the longest delay period determined by the plurality of nodes.

Turning to FIG. 1, a block diagram of a communication system 100 is shown in which the present invention can be embodied. The communication system 100 includes a source 102 that can provide data to a communication network 104. The data provided by the source 102 can be multicast or broadcast data such as streaming audio or streaming video data which is then distributed and transmitted by the network 104, for example using IP multicast. Such streaming audio and video data is known in the art. The data can also be other types of data that are transmitted by a source 102 and broadcast or distributed by the communication network 104 such that the data is received by a plurality of users that are connected to the network.

Network equipment includes base stations or access nodes 106, 108 and 110. Access nodes include known transceivers 109 and controllers 111 that operate the nodes as they receive data from the network 104 and transmit to users and mobile stations. The access nodes 106-110 can be any of a number of different types of wireless technologies including second, third and fourth generation wireless technologies. These networks can include CDMA, GSM, CDMA2000, W-CDMA, UMTS, WiFi, WiMAX and other known and developing networks. In the context of the invention as described below, the access nodes conform to IEEE 802.16 and WiMAX standards. The invention functions and operates with other types of wireless technologies such as CDMA. The wireless network 104 includes different network equipment (not shown) to transmit and receive packets of data from a source and between users.

Access nodes 106-110 receive data packets from the network 104 and transmit the packets in a defined area known as cells 112, 114 and 116, respectively. As seen the cells 112-114 can overlap in regions such that access node 112 and access node 114 provide packets to the same location and a user. Access nodes 106-110 are arranged in a known pattern so that overlapping pattern ensures that a user can receive packets throughout the service area of the network 104. Access nodes 106-110 transmit the packets containing data received from source 102 to the users that are using mobile stations 118, 120, 122, and 124, which can be at any location within the cells 112-116.

Mobile stations 118-124 can move throughout network 104 and can receive data packets from any of the access nodes 106-110. As mobile stations 118-124 roams from one cell to another cell while receiving packets from an access node, the call is handed over from the access node serving the one cell to the access node serving the another cell in a known manner. In broadcast or multicast transmissions, it is desirable for each access node 106-110 to synchronously transmit the data packets so that mobile stations 118-124 receive the signals for the same data packet at the same time from multiple access nodes. Typically, the probability of receiving the data packet successfully in the presence of fading, interference, and noise is higher when the mobile station receives identical signals from multiple access nodes, as compared to when the mobile station receives the signal from just a single access node. Further, a mobile station 118-124 that roams from one cell 112-116 maintains the connection and the data packet transmission and the broadcast transmission is not interrupted. By providing synchronous transmission of the broadcast data packets from each of the access nodes 106-110, the present invention can overcome receiving the data packets asynchronously from the network 104 and source 102 as well as overcome missing data packets that are not received by some of the access nodes.

In some embodiments of the communication network 104, the network provides RTP, RTCP or SRTP data packets to the access nodes 106-110. RTP and RTCP data packets include headers and payloads and are used to transmit, receive and confirm transmission of data within the network 104 and between access nodes 106-110 and mobile stations 118-124. Typically, RTP data packets are sent more frequently than RTCP data packets. RTP data packets can include a time stamp that indicates the sampling instant of the data packet. The time stamp can include a sampling counter of the RTP data packet such that the access node 106-110 and the mobile stations 118-124 know how many samples are included or encoded within the payload of the data packet. In an embodiment, the sampling counter provides the number for the first sample of the source material contained in the data packet. For example, if a first packet of data has a sampling counter of 1 for the first set of samples, and there are 100 samples in the first set, then the second packet of data may have a sampling counter of 101. Thus, the first packet has the samples 1-100 and the second set has the samples 101-200 and so on. In addition, each RTP packet has a time stamp that indicates the sampling instant in which the packet is sent. The RTCP packet, which is sent less frequently than a RTP packet, includes the instantaneous value of a sampling clock and the value of the real time clock that correspond to the transmission time of the RTCP packet.

Based on the data of the time stamp, sampling counter, sampling clock and the value of the real time provided by the RTCP packets, the wall clock time corresponding to the timestamp value or sampling instant of each RTP packet can be determined by each of the access nodes 106-110. In addition, the time it takes for each node 106-110 to receive a packet of data from the network 104 and the source 102 can be determined. This period of time is the delay time between the sending a packet by the source and receiving the packet by the access node, and is typically in millisecond range. As the access nodes are located in various places throughout the network, the delay time can vary between each of the plurality of access nodes.

In an embodiment of the invention, the delay times determined by each of the access nodes 106-110 is transmitted to and compiled by a lead node, which can be one of the access nodes. The lead node thereby can determine a delay period between the sending and receiving of data packets from the source 102 and network 104 to the access nodes 106-110 in which it is known that all of the access nodes will have received a data packet. In an embodiment, the lead node determines a delay period that is sufficient long to encompass the longest delay time for each of the access nodes. In another embodiment, the delay period can be a time in which a given percentage of access nodes have received packets from the source. The determined delay period is then sent to each of the access nodes and is used by the nodes to synchronously transmit data packets, including RTP and RTCP packets, from each of the access nodes. Thus, each access node sends a data packet at the same wall clock time where that data packet includes the same data for each access node. In an alternative embodiment, each access node uses a different delay time from the receipt time of a data packet such that each access node 106-110 synchronously transmits a data packet containing the same data at the same wall clock time.

Figure 2:
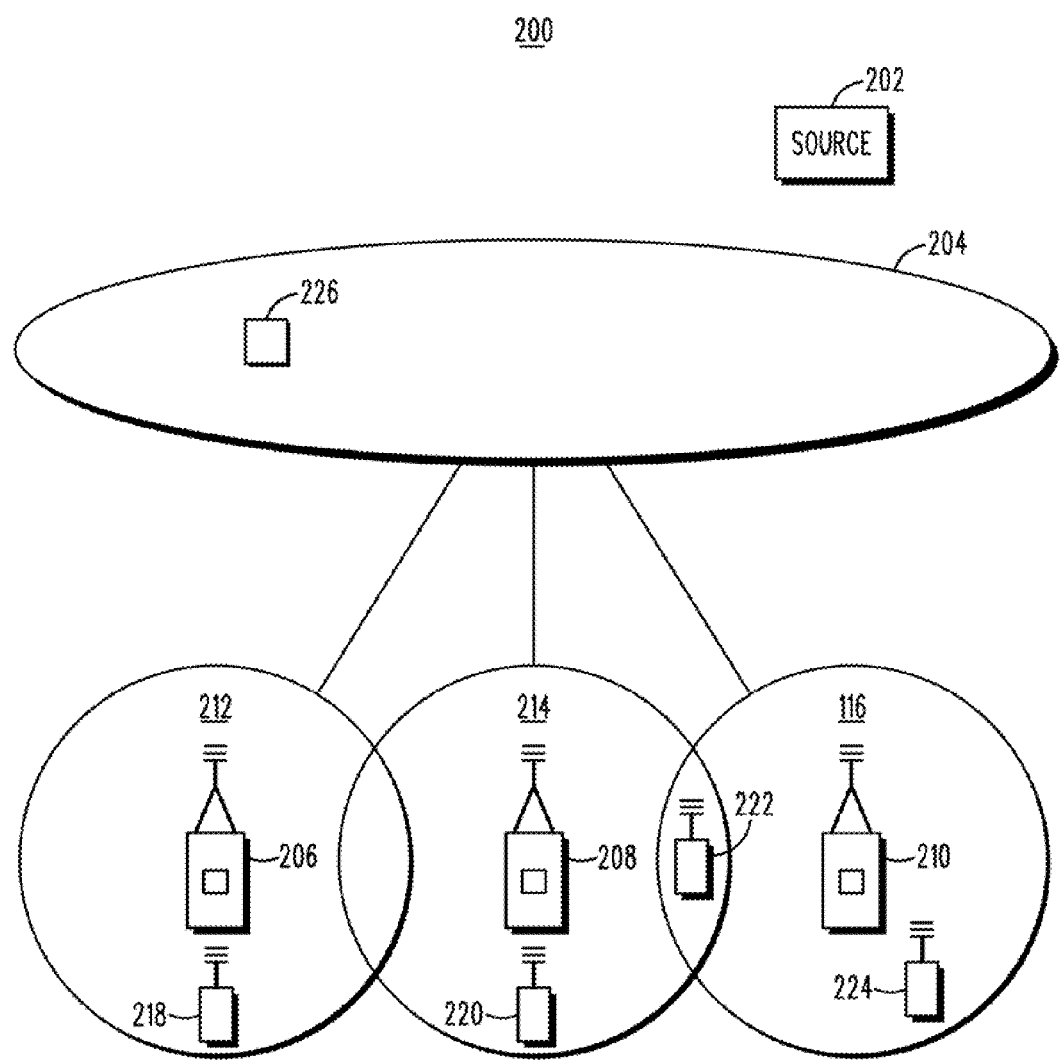
FIG. 2 is a block diagram of another wireless communication system that operates in accordance with some embodiments of the present invention.

FIG. 2 is a block diagram of a communication system 200 for another embodiment of the present invention. The communication system 200 includes a source 202 that can provide data to a wireless communication network 204. The data provided by the source 202 can be multicast or broadcast data such as streaming audio or streaming video data which is then distributed and transmitted by the network 204. The network 204 includes equipment such as access nodes 206, 208 and 210. Access nodes 206-210 receive data packets from the network 204 and transmit the packets in cells 212, 214 and 216, respectively. Access nodes 206-210 transmit the packets containing data received from source 202 to the users that are using mobile stations 218, 220, 222, and 224, which can be at any location within the cells 212-216.

As stated, it is desirable for each access node 206-210 to synchronously transmit broadcast or multicast the data packets so each mobile station 218-224 can receive the same data packet at the same time from multiple access nodes. Based on the data of the time stamp, sampling counter, sampling clock and the value of the real time derived from the RTP and RTCP packets, the wall clock time corresponding to each RTP packet can be determined by each of the access nodes 206-210. In addition, each of the access nodes can determine the time it takes for each node 206-210 to receive a packet of data from the network 204 and the source 202. The delay times determined by each of the access nodes 206-210 is transmitted to and compiled by a central control node 226 in the network 204. The control node 226 thereby can determine a delay period between the sending of data packets from the source 202 and network 204 to the access nodes 206-210. In an embodiment, the control node 226 determines a delay period that is sufficiently long to encompass the longest delay time for each of the access nodes.

Figure 3:
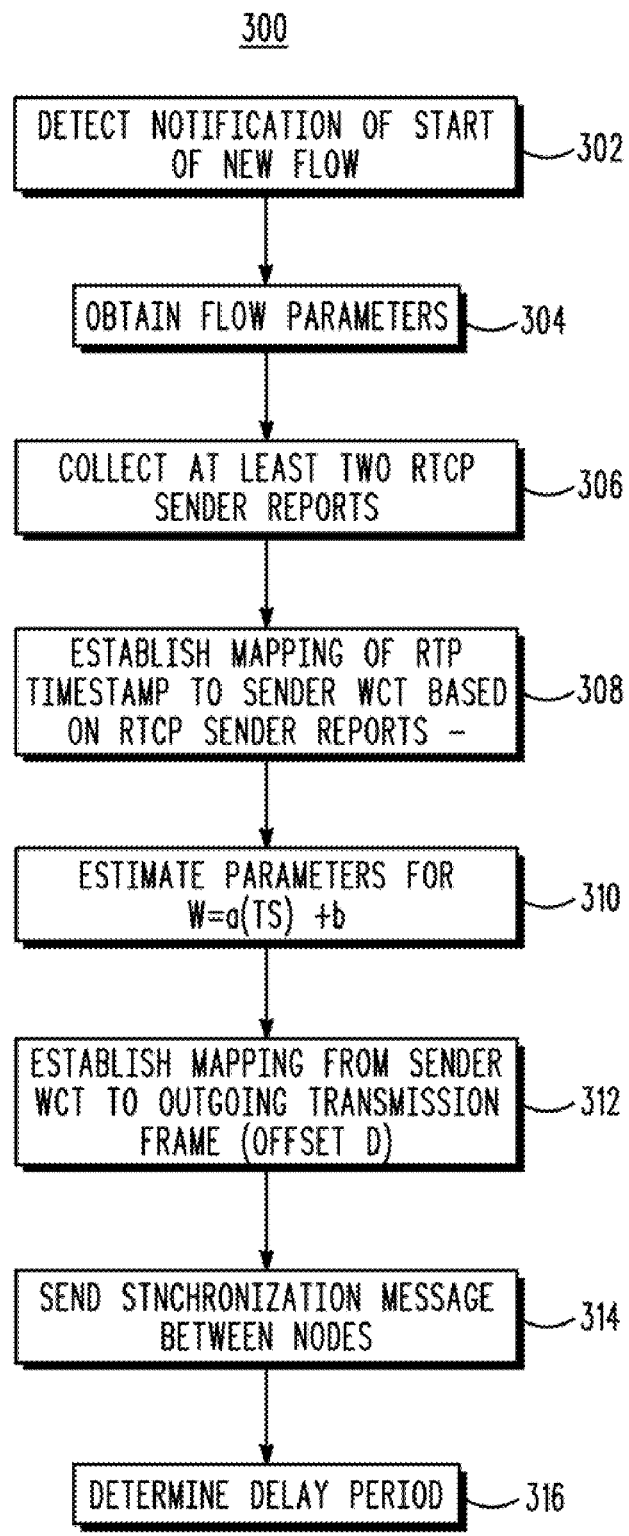
FIG. 3 is a flow chart to determine the delay period in accordance with some embodiments of the present invention.

FIG. 3 is a flow chart 300 that illustrates the steps of the present invention. The process of synchronously sending data packets from multiple access nodes 106-110 begins when the access nodes detect 302 that a new data flow is being sent from a source 102 through network 104. The data flow is a multicast or broadcast data flow that can include video or audio streaming of data from a source 102. As a multicast or broadcast data flow it is desired that each mobile station 118-124 receives the data at the same time from multiple access nodes and that a mobile station can receive the data as it roams throughout the network 104. The network 104 and the access nodes 106-110 can detect that a new data flow is being started by receipt of a notification sent from the source. In an IP network the data flow uses RTP and RTCP packets to transmit and receive control and payload data between the source 102 and the mobile stations 118-124.

Access nodes 106-110 within the network 104 obtain 304 flow parameters including IP multicast data, addresses, connection identifiers (CID), scheduling parameters and other control data by various means, for example by provisioning from a control node (not shown). As is understood, RTCP packets are sent by the network 104 to access nodes 106-110 at a slower rate than the RTP packets. Each access node 106-110 collects 306 at least two RTCP packets and obtains sender reports that are a part of each RTCP packet.

A mapping of the RTP time stamp and sampling clock is established 308 to the wall clock time of the source 102. The mapping is established by using the RTCP sender reports, each of which contains an instantaneous value of the time stamp and sampling counter at the source and the corresponding wall clock time at the instant that the RTCP packet was sent by the source. In an embodiment of the present invention, the mapping of the RTP timestamp or sampling counter to the wall clock time is based on using parameters a and b 310 and has the form W=a(TS)+b, where W is the wall clock time and TS is the time stamp value. This is based on the idea that linear relationship exists between the sampling counter or RTP timestamp and the wall clock time at the source. If an RTP or RTCP packet was generated at the source at wall clock time W, then the value of the timestamp or sampling counter TS that would be put in the packet by the source are related by a linear relationship of the form W=a (TS)+b, for some parameters a and b. Each RTCP packet contains an instantaneous value of TS and W, corresponding to the values of the timestamp or sampling counter and the wall clock time at the source at the instant the packet was generated. Thus by observing the values of timestamp TS and wall clock time W contained in two RTCP packets, it is possible for an access node to estimate the constants a and b. To obtain the constants a and b, a mapping of the wall clock time to the time stamp or the sampling counter can be determined at multiple instants of time. An access node may use more than two RTCP packets to refine the estimates of a and b so that there may be multiple mappings. The mapping between TS and W may be of a non-linear form rather than the linear form described above. Suitable parameters for such a mapping may be estimated by an access node by observing an appropriate number of RTCP sender reports. It may also be noted that the access nodes may conduct a signaling procedure amongst themselves or with a controller node such as 226, in order to ensure that consistent values of the parameters of the mapping at all the nodes.

Next, a mapping can be established 312 between the wall clock time of a packet and the outgoing transmission time for the packet based on a delay time or offset. The delay time or offset is the time after the wall clock time in which an access node transmits data to mobile stations such that each access node transmits the data synchronously with the other access nodes. In an embodiment, the delay time or offset is sent 314 between access nodes using a synchronization message sent between access nodes. A lead node or controller node 226, which is a part of the network 104, obtains the various delay times or offsets from each of the access nodes using the synchronization message and based on those delay times determines 316 a delay period from the wall clock time in which the access nodes transmit data packets to mobile stations. The delay period can be at least as long as the longest delay time or offset received from the various access nodes or can be some other value that most of the access nodes are ensured of synchronously sending the data packets.

Figure 4:
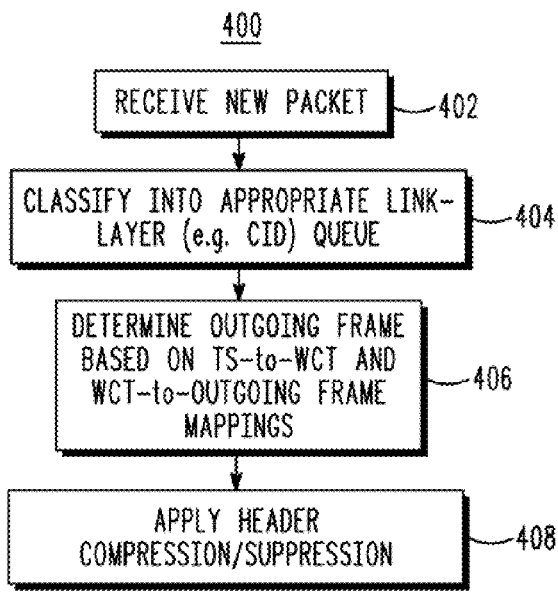
FIG. 4 is a flow chart of receiving a packet at an access node in accordance with some embodiments of the present invention.

FIG. 4 illustrates a flow chart 400 for receiving a data packet at each of the access nodes 106-110 within the network 104 and processing the data packet for transmission to the mobile stations 118-124. Each access node receives 402 a packet sent by network 104 where the packet originates with data from the source 102. Upon receipt, the access node 106-110 classifies 404 the data packet into the appropriate queue for transmission, e.g. the appropriate CID or link-layer queue for the data packet. The access node 106-110 then determines 406 the outgoing time to send the data packet based on the mapping between the time stamp or sampling clock and the wall clock time, and the mapping between the wall clock time to outgoing transmission time or frame based on a delay period or offset. The outgoing transmission time is set so that the packets are synchronously sent from each of the access nodes 106-110. In an embodiment of the invention, header compression and suppression is applied 408 to the data packet at the access nodes prior to transmission. It is noted that compression and suppression may be applied at each of the access nodes, but it is possible that some access nodes will apply compression and suppression while other access nodes will not. The scope of the invention is maintained provided that the access nodes synchronously send the packets.

Figure 5:
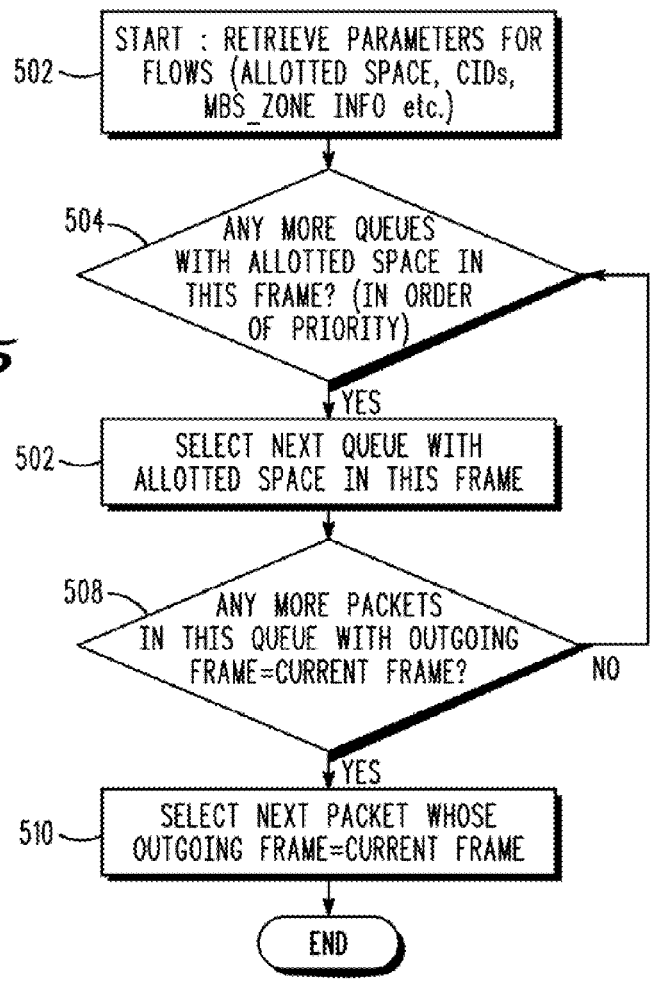
FIG. 5 is a flow chart of constructing a data packet for transmission using the principles of the present invention.

FIG. 5 is a flow chart 500 illustrating how a frame is constructed for transmission where the frame includes packets such as RTP and RTCP packets. The process starts by retrieving 502 parameters needed for the transmission of the frames from the access nodes. The parameters include allotted space, CIDs, etc. that are provided when the source 102 sends the multicast or broadcast data to the network 104. The access nodes 106-110 each determine 504 if there are more queues with allotted space to be included in a frame. In other words, it is determined if the frame can include more packets of information. If it determined that there is room within the frame, the access node selects 506 the next queue with allotted space for the frame that is to be sent. The access node then determines 508 if there are any more packets in the queue for the outgoing frame. If the answer is yes, then the next packet whose outgoing frame is equivalent to the ongoing frame is selected 510. If the answer to whether there are more packets in the queue is no, then the process returns to step 504 to determine if there are more queues with allotted space. The process stops when either there is no more space available in the frame, or there are no more data packets whose determined outgoing time is equivalent to the ongoing frame. The above description of the present invention has been described primarily in the context of asynchronous receipt of data packets at each of the access nodes. The present invention also provides for synchronous transmission of packets from access nodes when packets are lost between the source and the network or between the network and the access nodes. If a particular packet is lost, e.g. does not arrive through the network, at a particular access node, there will be a mismatch in the transmission of any subsequent packets "after" the lost packet between the access node that lost the packet and the other nodes that received the packet. This mismatch can be limited to the particular frame in which the packet would have been transmitted and only to the region corresponding to the particular flow. The present invention can overcome this and still synchronously send data packets from access points by using the determined delay period and using knowledge of lost data packets, which can be determined from data in packet headers such as sampling counters. It an embodiment of the invention, the RTP packet sent by the source and the network can be enhanced with an embedded cumulative byte count, which can be provided in RTP extension headers. Using the cumulative byte count, the access nodes may infer the length of the missing or lost packet based on the cumulative byte count of the next packet that is correctly received.

The present invention can also apply in frame overflow situations. An access node attempts to pack as much data as possible in a frame from amongst the packets whose outgoing transmission time is in that frame. If there are more packets than can fit in the frame, the additional packets are assumed to be discarded. The probability of this event occurring can be controlled by admission control, which is using knowledge of the effective bandwidth of the flow to estimate whether the flow should be admitted or not. The admission control can be performed at an overlay level within the access node thereby providing the access node with a capacity of the transmission system. The access node can estimate whether the effective bandwidth of the source is less than the remaining capacity of the access node to see whether the new source should be admitted to the transmission. Instead of dropping overflow packets, the access node can buffer the overflow packets and schedule the overflow packets for transmission in subsequent frames. In this case, if the packet is lost at a particular access node, then the effect of mismatched transmissions can be propagated past a given frame and may not be time limited. Synchronization across the access nodes using the principles of the present invention as described above can be used to overcome the missing frames.

The situation of missing frames assumes that the allocation within a given frame for a particular multicast or broadcast transmission is known a priori and that the access node can pack the frame appropriately. Scheduling inefficiencies may occur with variable rate flows. If there is not enough data to fill up the allocation, transmission slots may be idle. Thus, scheduling allocation maybe dynamically adapted, for example by tracking the average rate of coding at the source. The access nodes may therefore exchange frame overflow/underflow information with each other using the lead node or the control node in accordance with the principles of the present invention. The scheduling allocations of each access node can therefore be adapted by the lead node or control node choosing the appropriate scheduling to maintain synchronization across the access nodes. Alternatively, the access nodes can be set up so that there are no a priori allocations. Each access node then fills up the frame with as much data as is available for each flow and packet loss can occur. When packet loss occurs, the synchronization of packet transmission can be maintained in accordance with the principles of the present invention.

An access node may be expected to perform robust header compression (ROHC) for an RTP packet before transmission of the packet to the mobile stations. When the transmission is a multicast or broadcast flow, the ROHC mode may be unidirectional where there is no feedback from the mobile stations that receive the access node's transmission of the flow. Without feedback, the access node performing ROHC sends a configurable number of initialized or refreshed packets followed by a configurable number of first order packets and then transmits second order difference packets. A timeout may be used to go back to sending initialized or refreshed packets and cycle repeats. The number of each type of packet can be tuned based on the desired tradeoff between loss probability and compression. In the absence of packet losses in the network 104 and with a pre-arranged number of frames for initialized, first order and second order frames, ROHC is a deterministic operation at the compressor. Thus, all transmit nodes can individually perform ROHC of RTP packets which may affect synchronization across the different access nodes. Using the principles of the present invention by exchanging the information regarding compression using the lead node or control node, a particular frequency of initialized or refreshed packets can be agreed upon at the start of the transmission. If a packet is lost during the flow, the principles of the present invention would overcome the mismatch the next time all the access nodes synchronously send the next refreshed packet. Thus, the mismatch may be limited in time.

As described above, the present invention can be used with Secure RTP packets, which are encrypted RTP packet streams that protect content. In this embodiment, the RTP fixed header is left encrypted and the rest of the RTP packet is encrypted, which may facilitate header compression. As can be appreciated, the modification of the packets does not affect the ability of the access nodes to synchronize the transmission of packets to the mobile stations.

According to the principles of the present invention, access nodes determine a mapping between a time reference, such as a wall clock time, at the source 102 and the time reference at the access nodes. The mapping may be determined in two stages by using the mapping between the time stamp and the wall clock time and using the mapping between the wall clock time at the source and the frame number at the access nodes, which is based on the delay period that is determined. The delay period needs to be large enough so that a packet generated at a given time at the source will have reached most if not all of the access nodes before its outgoing frame. The access nodes can determine a transmission time equal to the wall clock time plus a delay period by agreeing upon a suitable large value for the delay period through message exchanges with a lead node or a control node. Other mappings from the wall clock time to the transmission time based on the delay period are possible. The access node determined the first stage map by collecting multiple RTCP sender reports which contain an instantaneous sample of time stamp. Once the first and second stage mapping is constructed, each access node can operate autonomously.

It can be appreciated, however, that changes in the wireless network 104 may cause the access nodes to reassess the described mappings. These changes may include the addition or deletion of an access node within the network or changes in network conditions. Such a change would affect the different delay times between the nodes whereby the previously agreed delay period may not be sufficient or may be too long. Similarly, a new flow starting from a source may cause the access nodes to reassess the delay period used.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method of transmitting packets synchronously from a plurality of nodes in a wireless communication system, the method comprising:
   receiving packets asynchronously at the plurality of nodes wherein the packets are sent from a source node;
   determining a wall clock time at each of the plurality of nodes wherein the wall clock time is determined from control data of the packets and wherein the wall clock time is a time when the received packet is transmitted from the source node;
   determining a delay period to be added to the wall clock time to determine an outgoing transmission time for each of the plurality of nodes that receive the packet; and
   transmitting the packets synchronously from each of the plurality nodes at the outgoing transmission time.

2. The method of claim 1 wherein determining the delay period comprises:
   determining for each of the plurality of nodes a period of time needed to receive a packet from the source node, and
   setting the delay period based on the period of time determined at each of the plurality of nodes.

3. The method of claim 2 wherein setting the delay period comprises setting the delay period to be at least the longest period of time needed to receive the packet from the source node determined for each of the plurality of nodes.

4. The method of claim 1 wherein packets are at least one of:
   Real Time Protocol packets;
   Secure Real Time Protocol packets; and
   Real Time Control Protocol packets.

5. The method of claim 1 wherein the determining the wall clock time comprises using a mapping of the wall clock time to at least one of a time stamp and a sampling counter received from the control data.

6. The method of claim 5 wherein the mapping of the wall clock time to at least one of a time stamp and a sampling counter received with the packet further comprises determining the mapping at multiple instants of time.

7. The method of claim 5 wherein using the mapping of the wall clock time to at least one of a time stamp and a sampling counter received with the packet further comprises conveying of the mapping to the plurality of access nodes.

8. The method of claim 1 wherein a packet is received by at least one of the plurality of nodes and not received by at least another of the plurality of nodes.

9. The method of claim 1 wherein the time of transmission of the packets from each of the plurality of nodes is a function of a cumulative byte count contained within the packets.

10. The method of claim 1 wherein determining the delay period comprises:
    determining a period of time between when the source node sends a packet and when the packet is received at each of the plurality of nodes;
    determining the delay period based on the period of time from each of the plurality of nodes; and
    sending the determined delay period to each of the plurality of nodes.

11. The method of claim 1 further comprising compressing the packet.

12. A node for use in a wireless communication network, the node comprising:
    a transceiver for transmitting and receiving data wherein the transceiver receives packets asynchronously as compared to other nodes;
    a controller coupled to the transceiver wherein the controller is adapted to:
    determining a wall clock time when a packet was transmitted to the node from a source node, wherein the wall clock time is determined from control data of the packet;
    determining a delay period to be added to the wall clock time to determine an outgoing transmission time to send the packet from the node; and
    transmitting the received packets at the outgoing transmission time so that the packet is synchronously transmitted with packets transmitted from the other nodes.

13. The node of claim 12 wherein the transceiver receives the delay period and wherein the received delay period is based on the delay time determined by the controller and delay periods determined by controllers at the other nodes.

14. The node of claim 13 wherein the received delay period is a longest delay time determined by the controller of the node and the other nodes.

15. The node of claim 12 wherein the wall clock time is determined by a time stamp and a sampling counter received with the packets.

16. The node of claim 12 wherein the packets are at least one of a Real Time Protocol packet, a Real Time Control Protocol packet and a Secure Real Time Protocol packet.

17. A wireless communication system comprising:
a source of data;
a communication network that receives the data from the source and transmits the data in packets;
a reference node within the communication network; and
a plurality of access nodes within the communication network that asynchronously receive the packets transmitted by the reference node, wherein each of the plurality of access nodes synchronously transmits the packets from the access nodes at an outgoing transmission time is based on a delay period determined from control data in the packet and a wall clock time determined at each of the access nodes.

18. The wireless communication system of claim 17 wherein the determined delay period is received by each of the plurality of nodes and is at least the longest delay period among all the plurality of nodes.

19. The wireless communication system of claim 17 wherein the communication network is an Internet Protocol multicast network.

20. The wireless communication system of claim 17 wherein the packets are at least one of a Real Time Protocol packet, a Real Time Control Protocol packet and a Secure Real Time Protocol packet.

* * * * *